(12) United States Patent
Nelson

(10) Patent No.: US 9,750,963 B2
(45) Date of Patent: Sep. 5, 2017

(54) ADVANCED AIRBORNE FIRE FIGHTING SYSTEM

(75) Inventor: Donald M. Nelson, Fair Oaks, CA (US)

(73) Assignee: United Aeronautical Corp, North Hollywood, CA (US)

(*) Notice: Subject to any disclaimer, the term of this patent is extended or adjusted under 35 U.S.C. 154(b) by 690 days.

(21) Appl. No.: 12/684,292

(22) Filed: Jan. 8, 2010

(65) Prior Publication Data

US 2011/0168414 A1 Jul. 14, 2011

Related U.S. Application Data

(60) Provisional application No. 61/143,364, filed on Jan. 8, 2009.

(51) Int. Cl.
*A62C 3/02* (2006.01)
*B64D 1/16* (2006.01)

(52) U.S. Cl.
CPC .............. *A62C 3/0228* (2013.01); *B64D 1/16* (2013.01)

(58) Field of Classification Search
CPC ....... A62C 3/02; A62C 3/0228; A62C 3/0242; B64D 1/16; B64D 1/18
USPC .................................. 239/171, 373; 169/53
See application file for complete search history.

(56) References Cited

U.S. PATENT DOCUMENTS

| | | | | |
|---|---|---|---|---|
| 496,843 | A * | 5/1893 | Arnott et al. | B67D 1/0425 222/209 |
| 556,741 | A * | 3/1896 | Durrin | B65D 47/40 222/109 |
| 1,191,737 | A * | 7/1916 | Rousseau | A45D 27/12 222/243 |
| 2,515,568 | A * | 7/1950 | Pharo | B05B 9/0816 220/243 |
| 4,936,389 | A | 6/1990 | MacDonald et al. | |
| 5,279,481 | A | 1/1994 | Trotter et al. | |
| 7,165,627 | B2 | 1/2007 | Hutter et al. | |
| 2006/0260826 | A1 * | 11/2006 | Hutter | B64D 1/16 169/51 |

* cited by examiner

*Primary Examiner* — Christopher Kim
(74) *Attorney, Agent, or Firm* — Tsircou Law, P.C.

(57) ABSTRACT

A system for dispersing liquid over a desired location, the system comprising a pressurized tank having a main body, an inlet in fluid communication with the main body for introducing liquid to the main body, an outlet in fluid communication with the main body for dispersing the liquid, and an air inlet for charging air under pressure into the main body, where the improvement comprises providing a diffuser for slowing down pressurized air entering the main body from the inlet.

41 Claims, 12 Drawing Sheets

ADVANCED AIRBORNE FIRE FIGHTING SYSTEM

REFERENCE TO RELATED APPLICATION

Figure 1:
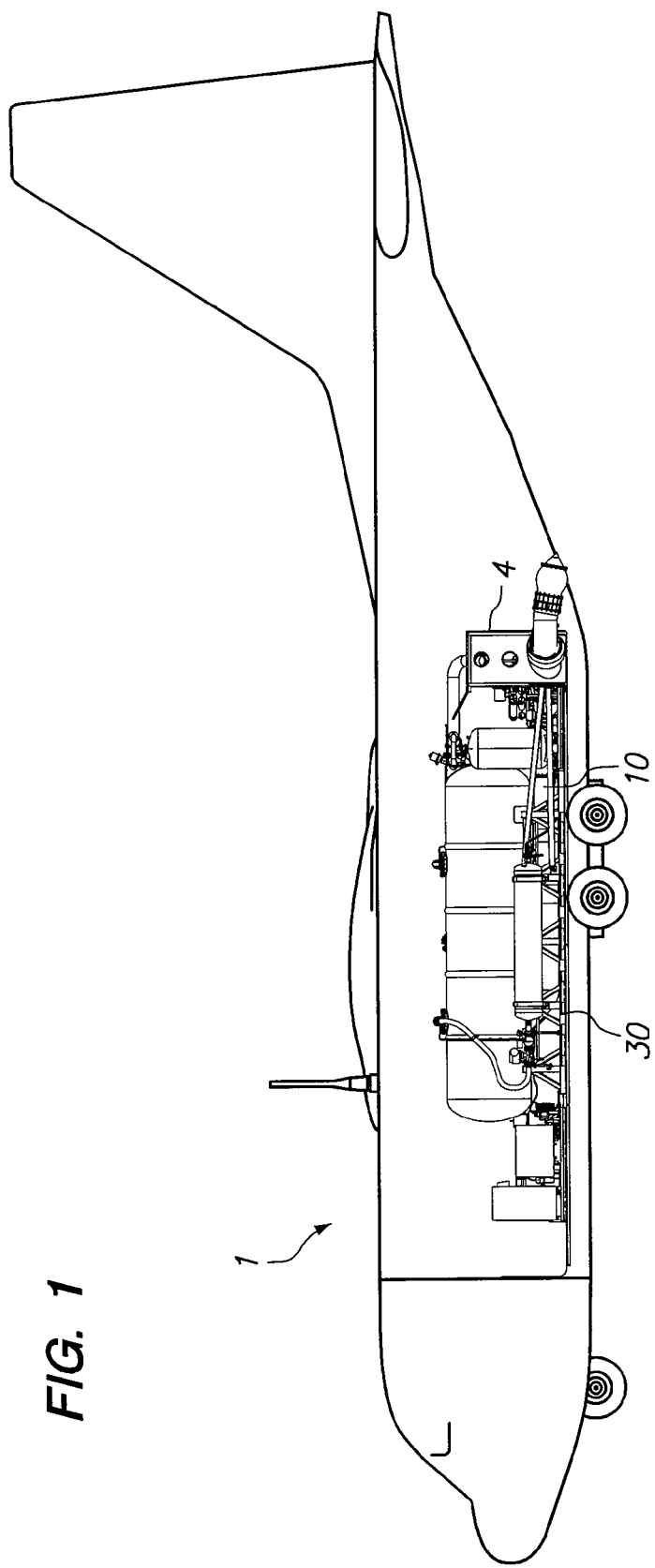

This application claims the benefit of U.S. Provisional Patent Application No. 61/143,364, filed Jan. 8, 2009, the complete disclosure of which is incorporated herein, in the entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files and records, but otherwise reserves all other copyright rights.

BACKGROUND OF THE INVENTION

Field of the Invention

This invention relates to airborne fire fighting suppression systems. In particular, the invention relates to an improved system for dispersing pressurized fire-extinguishing materials from an airborne fire fighting platform.

Description of Related Art

Aircraft are commonly employed for the aerial dispersion of liquid and/or solid materials such as fire retardant or fire extinguishing materials, oil dispersant materials, bio-remediation materials, fertilizer materials, herbicide materials, defoliant materials, pesticide materials, etc., over a target. Many vintage aircraft are converted for aerial dispersion of materials by the permanent installation of material dispersion equipment.

Modular aerial spraying systems have also been developed for use in conversion of cargo aircraft for aerial spraying purposes. Known as Modular Airborne Fire Fighting Systems ("MAFFS") or advanced modular airborne fire fighting system, these systems employ portable pressurized tanks, which are loaded onto cargo aircraft, for instance C-130 aircraft, through the lowered rear cargo ramp of the aircraft.

Various fixed and rotary wing aircraft such as the Douglas DC-6 and DC-4, Lockheed Martin P-2 Neptune and P-3 Orion, and the Sikorsky UH-60L/S-70A Black Hawk helicopter and other types of fixed and rotary wing aircraft, have in the past been extensively modified to undertake airborne fire fighting operations. Typically, modifications to the airframe are made to accommodate the weight of, and loads resulting from the dispersal of high volume water and foam retardant fluid. These aircraft are referred to as air tankers. Their combined water and retardant delivery capacity, as well as the delivery dispersal pattern of the water on the ground, determine if the aircraft qualifies for one of several air tanker ratings, which are certified by the Interagency Air Tanker Board (IAB).

Among the many methodologies developed over years of aerial wildland fire fighting, is the constant flow retardant delivery tank system, which uses a pair of doors that open gradually to permit progressive release of the retardant mixture from within an air tanker's fluid reservoir. This constant flow water bombing methodology can counteract the forward motion of the aircraft at various speeds while maintaining an even, well grouped, user programmable, retardant dispersal pattern on the ground.

One variant of such a system was disclosed by MacDonald and Neuwirth, in U.S. Pat. No. 4,936,389, which issued on Jun. 26, 1990, entitled "Fluid Dispenser for an Aircraft". MacDonald discloses a system wherein a head sensor determines the level of retardant in the aircraft retardant tank and dynamically controls the aperture of the drop doors to counter aircraft forward velocity to achieve a consistent dispersal pattern. A similar constant flow system, which calculates the remaining amount of fluid within a tank relative to aircraft ground speed to achieve controlled retardant discharge is disclosed by Foy and Uglum in U.S. Pat. No. 5,320,185, which issued on Jun. 15, 1994, entitled "Aircraft Fluid Drop System" and also Foy and Uglum in U.S. Pat. No. 5,451,016, which issued on Sep. 19, 1995, which was also entitled "Aircraft Fluid Drop System".

Another methodology used to achieve constant flow rates is disclosed by Trotter and Woods in U.S. Pat. No. 5,279,481, which issued on Jan. 18, 1994, entitled "Airborne Liquid Spreading System". In the disclosed system, the differential pressure across the drop doors between internal tank pressure and external ambient pressure is determined by a sensor which then relays signals to a controller that varies the aperture of the doors to maintain a constant flow rate during the drop sequence.

U.S. Pat. No. 7,165,627, entitled "Portable Airborne Firefighting and Sensing System", discloses a fire fighting apparatus adapted for use in a host aircraft comprising a fuselage. The fire fighting apparatus includes a pressurizeable retardant tank disposed in the interior of the host aircraft, the retardant tank being capable of roll-on and roll-off installation, and utilizes an ejection tube in fluid communication with the retardant tank. Various sensors are disclosed to effect user-discernable data for directing retardant delivery.

A typical mobile air dispersal system consists of a series of pressurized fire retardant tanks, with a total capacity of 2,700 gallons and associated equipment, which is palletized and carried in the aircraft's cargo bay. In addition to the retardant tanks, each module contains a pressure tank where compressed air is stored at 1,200 psi. The control module includes the master control panel, the loadmaster's seat, and discharge valves. An air compressor module provides air pressure for charging the system; it stays at the air tanker base during air operations and is used to recharge the system between runs. Each unit weighs about 11,000 pounds, with a load capacity of 2,700 gallons. They can be installed in any C-130 equipped with the USAF 463L cargo-handling system.

All the aforementioned constant flow methodologies have certain limitations and deficiencies, most notably, the inability to precisely control the rate of the dispersal of the liquid load.

Accordingly, there is a continuing, unaddressed need for an improved firefighting apparatus capable of controlled and precise delivery of pressurized retardant.

SUMMARY OF THE INVENTION

Disclosed are methods and systems for dispersing liquid over a desired location. The system generally comprises a pressurized tank having a main body, an inlet in fluid communication with the main body for introducing liquid to the main body, an outlet in fluid communication with the main body for dispersing the liquid, and an air inlet for charging air under pressure into the main body. A diffuser is provided for slowing down pressurized air entering the main body from In one embodiment, the diffuser directs the pressurized air across the upper region of the main body. In this way, the diffuser expands and slows down the pressurized air, effectively converting dynamic air pressure into static air pressure.

In a further embodiment, the diffuser comprises a base, generally cylindrical side walls and an opening opposite the base. In a preferred such aspect, the side walls expand circumferentially from the base to the opening.

In a preferred embodiment, the storage tank is housed within a host aircraft. The storage tank is preferably produced of stainless steel, more preferably a highly corrosive resistant stainless such as 2205 stainless steel.

The storage tank is preferably housed within the fuselage of a host aircraft.

The system will typically have a discharge pipe in fluid communication with the outlet. The discharge pipe preferably comprises a pintle nozzle, the pintle nozzle being capable of controlling the flow rate of discharge from the system.

In a still further preferred embodiment of the invention, the discharge pipe comprises an elbow for redirecting the subsequent portion of the pipe generally horizontal to the main body. An "S-duct" is preferably employed, having an elbow formed at an angle of about 45 degrees. In a preferred aspect, the discharge pipe is mounted to the storage tank by struts.

In a different embodiment, the system comprises a second outlet, and preferably the first and second outlets are in fluid communication with a single discharge pipe.

The system is preferably mounted on a pallet, which is preferably of the type adapted to reversibly roll-on/roll-off of the host aircraft.

The system may include a control interface assembly affixed to an operator chair mounted to the pallet.

In a further preferred embodiment, the system has a compressor in pneumatic communication with the air inlet, including a compressed air storage reservoir between the compressor and the storage tank. In a still further embodiment of the system, there is an additive tank for input of additives to the storage tank.

The invention also provides a method of dispersing fluid over a site of interest, the method comprising discharging fluid over the site of interest from a system comprising a pressurized tank having a main body, an inlet in fluid communication with the main body for introducing liquid to the main body, an outlet in fluid communication with the main body for dispersing the liquid, an air inlet for charging air under pressure into the main body, and a diffuser for slowing down pressurized air entering the main body from the inlet.

The system and method can be adapted for dispersal from various host aircraft, including helicopters and fixed wing aircraft. The fixed wing aircraft preferably comprises a wide-body aircraft, still more preferably an aircraft having a gross carrying capacity of greater than or equal to about 100,000 pounds.

Using the system and method of the invention, fire fighting liquids can be dispensed at a rate of greater than about 200 gallons per second. In a further preferred embodiment, the rate is greater than about 400 gallons per second, in a still further preferred embodiment, at a rate greater than about 600 gallons per second, and in a still further improved embodiment, the rate is greater than about 700 gallons per second.

These and other features and advantages of this invention are described in, or are apparent from, the following detailed description of various exemplary embodiments of the apparatus and methods according to this invention.

BRIEF DESCRIPTION OF THE DRAWINGS

FIG. 1 is a partially cut away left side view of a dispersal system of the present invention shown mounted on a Lockheed Martin C-130 aircraft.

FIG. 2 is a simplified top view of the dispersal system according to FIG. 1.

FIG. 3 is a back end view of the dispersal system showing the door of the aircraft and placement of the discharge pipe.

FIG. 4 is a simplified perspective view of the front end of the dispersal system showing the control components mounted to the system.

FIG. 5 is a side view of the tank component of the dispersal system.

FIG. 6 is a top view of the tank component shown in FIG. 5.

FIG. 7 is a perspective view showing the assembly the tank body.

FIG. 8 is a perspective view of diffuser components.

FIG. 9 is a side view of an assembled diffuser component.

FIG. 10 is a partial cut away view of FIG. 9.

FIG. 11 is a perspective view showing mounting of the diffuser mounted in the dispersal tank.

FIG. 12 is a partially cut away view showing the position of the diffuser within the tank.

FIG. 13 is a perspective view showing the components of the discharge pipe.

DETAILED DESCRIPTION OF THE INVENTION

The invention is now described in terms of the FIGURES to more fully delineate in more detail the scope, materials, conditions, and methods of the present invention. Many of the parts and components of the present invention are hereinafter described as being "assemblies". As used herein, the word "system" or "systems", or "apparatus" or "apparatuses" refers to the totality of related parts and materials related to a given component and its operability, and are not to be considered as limiting to a particular part, piece, or operation. Such portable, roll-on, roll-off aircraft installation are known as mobile, or advanced, integrated airborne fire fighting system.

In general, the invention comprises an improvement to fire fighting systems and apparatuses adapted for airborne fire fighting. Specifically, the systems and apparatus of the present invention can provide for an improved version of the mobile-type airborne dispersal systems that can also be used for oil dispersant materials, bio-remediation materials, fertilizer materials, herbicide materials, defoliant materials, pesticide materials, etc.

Also disclosed is a method of dispersing fluid over a site of interest, the method comprising discharging fluid over the site of interest from a system comprising a pressurized tank having a main body, an inlet in fluid communication with the main body for introducing liquid to the main body, an outlet in fluid communication with the main body for dispersing the liquid, an air inlet for charging air under pressure into the main body, and a diffuser for slowing down pressurized air entering the main body from the inlet.

The dispersal system provides an advanced version of a self-contained unit for aerial fire fighting that can be loaded onto a military cargo transport, typically a C-130 Hercules, which then allows the aircraft to be used as an air tanker against wildfires.

Looking now to FIG. 1, the system and method are adapted for dispersal from various host aircraft, including helicopters and fixed wing aircraft 1. The fixed wing aircraft 1 preferably comprises a wide-body aircraft, still more preferably an aircraft having a gross carrying capacity of greater than or equal to about 100,000 pounds.

More particularly, and in reference to FIGS. 2 through 7, a storage tank 10 is housed within the fuselage of the host aircraft 1. The storage tank 10 is preferably produced of stainless steel, more preferably a highly corrosive-resistant stainless such as 2205 stainless steel. Prior art designs using carbon fiber proved to be too unreliable, and frequently produced seepage problems. 2205 is not common, but non-corrosive and very stable and reliable.

The tank 10 is part of a dispersal system that includes a discharge pipe 12 in fluid communication with the outlet 14. In a still further preferred embodiment of the invention, the discharge pipe comprises an elbow 16 for redirecting the subsequent portion of the pipe generally horizontal to the main body. An S-duct is preferably employed, having an elbow formed at an angle of about 45 degrees to the tank. In a preferred aspect, the discharge pipe 12 is mounted to the storage tank by struts.

The system may comprise a second outlet 18, and the first 14 and second 18 outlets may be in fluid communication with a single discharge pipe 12.

The discharge pipe 12 ends in a pintle nozzle 20, the pintle nozzle 20 being capable of controlling the flow rate of discharge from the system. A second elbow 22 in the discharge pipe 12 directs the pintle 20 back from the end of the plane.

The system may be mounted on a pallet 30, preferably of the type adapted to reversibly roll-on/roll-off of the host aircraft.

Figure 5:
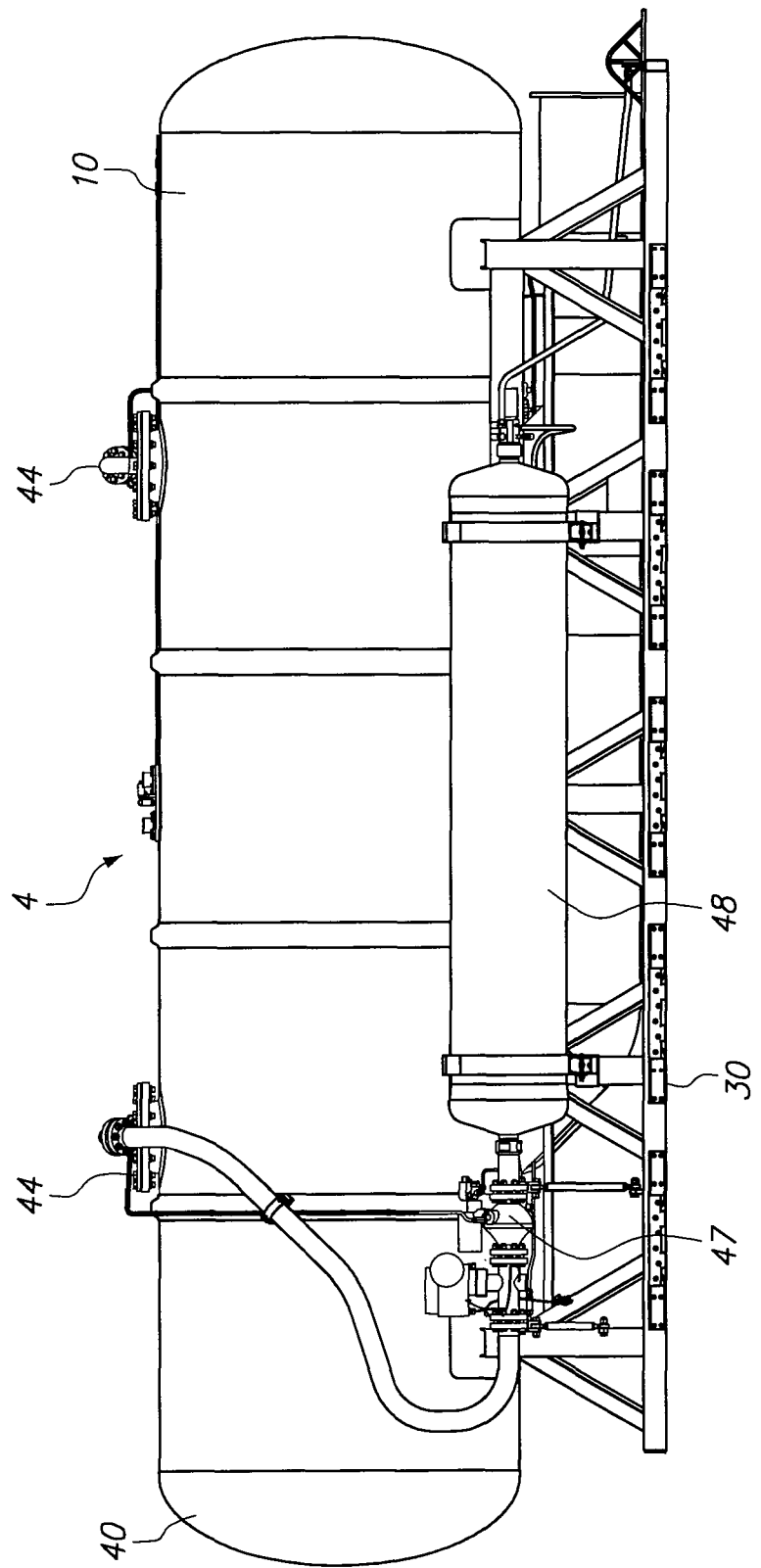
Figure 6:
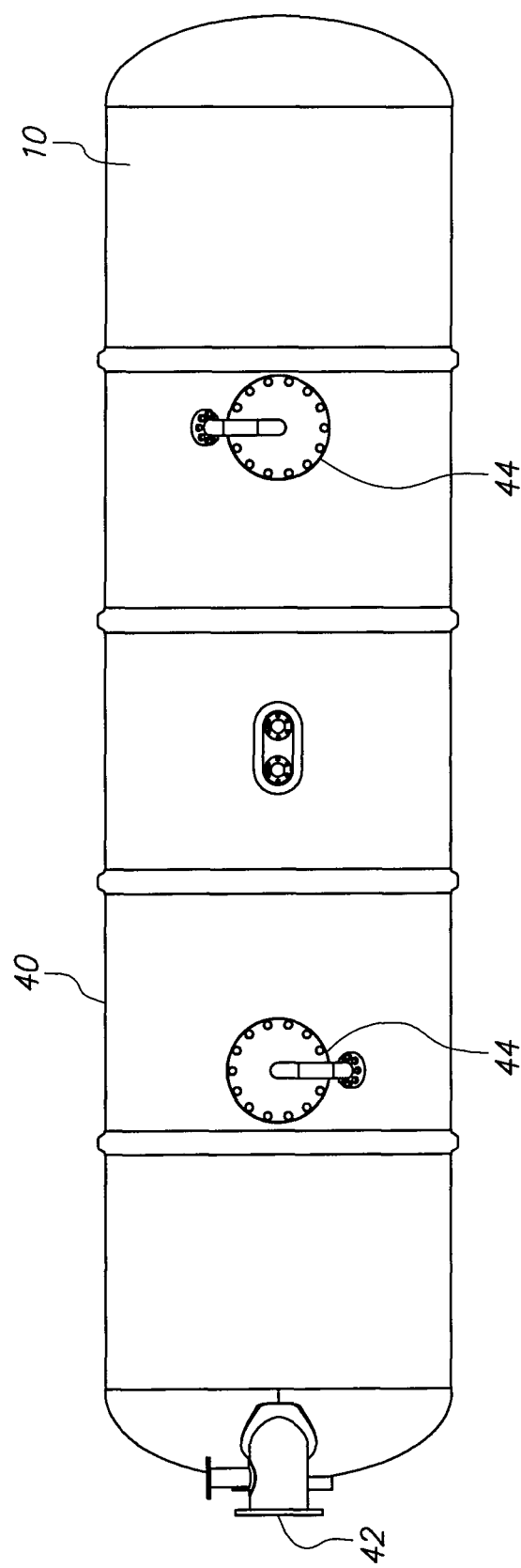
Figure 7:
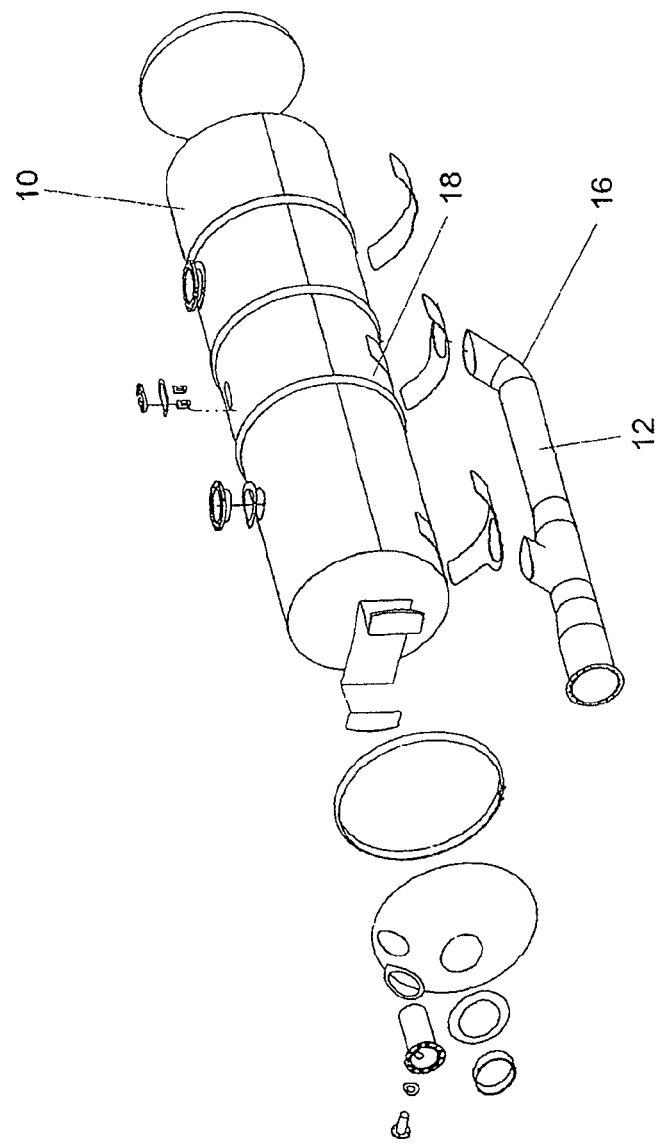
Figure 8:
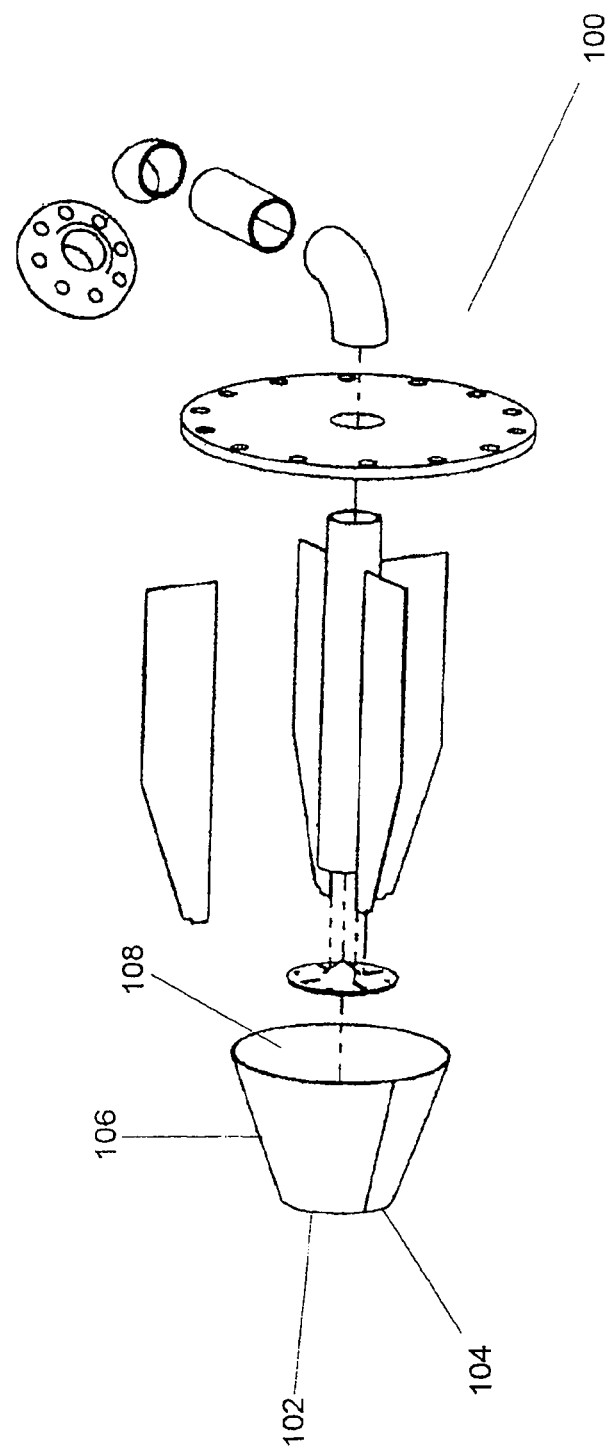
Figure 9:
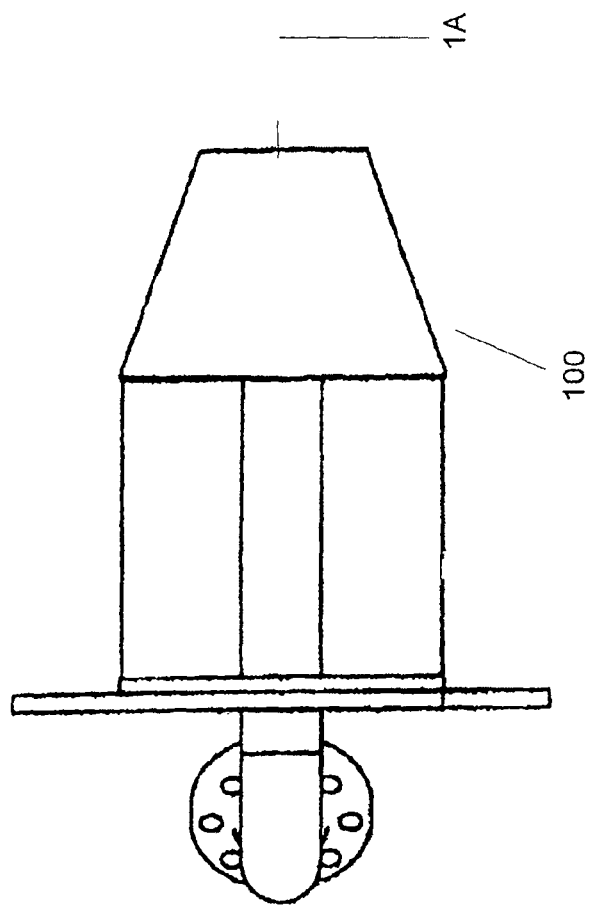
Figure 10:
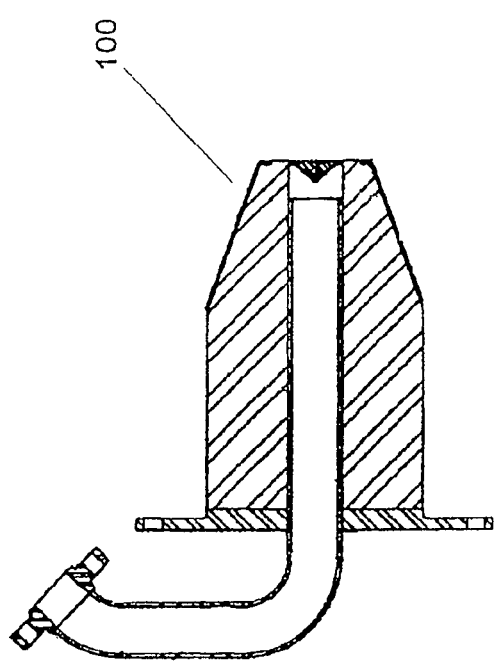
Figure 11:
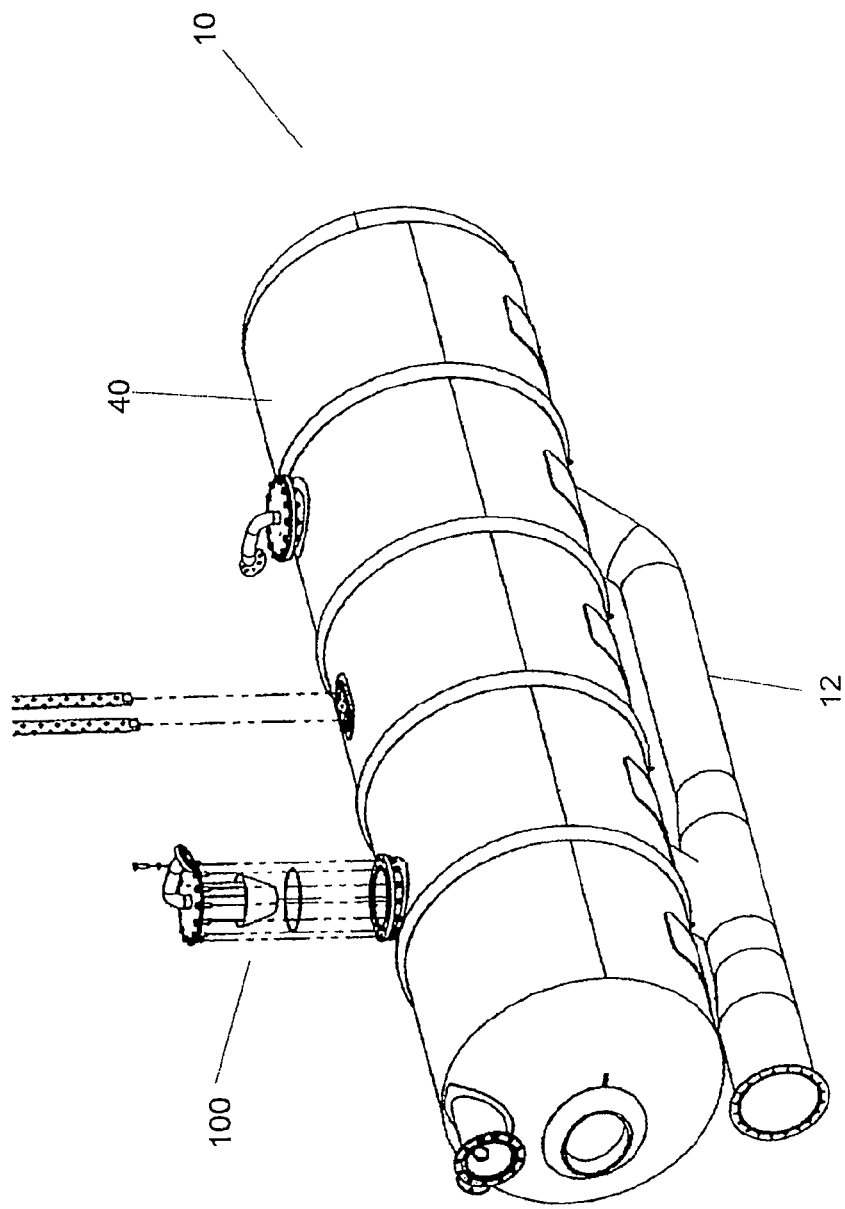
Figure 12:
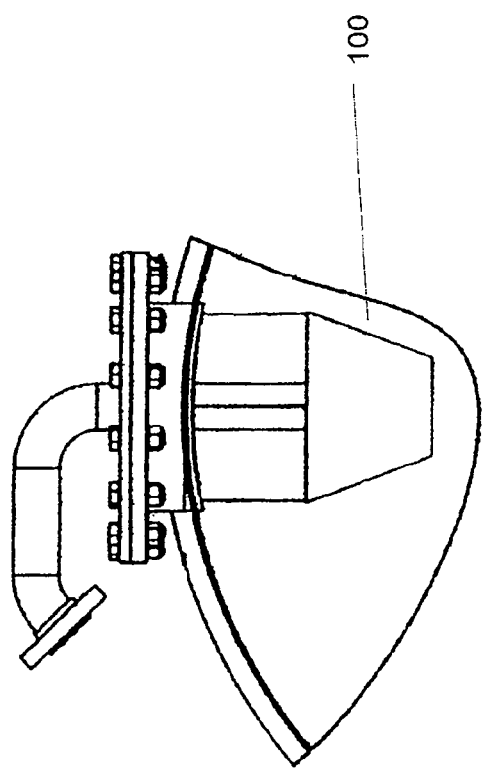

In reference to FIGS. 5 and 6, the pressurized tank 10 includes a main body 40 and an inlet 42 for introducing liquid to the main body of the tank, and an air inlet 44 for charging air under pressure into the main body 40.

Figure 2:
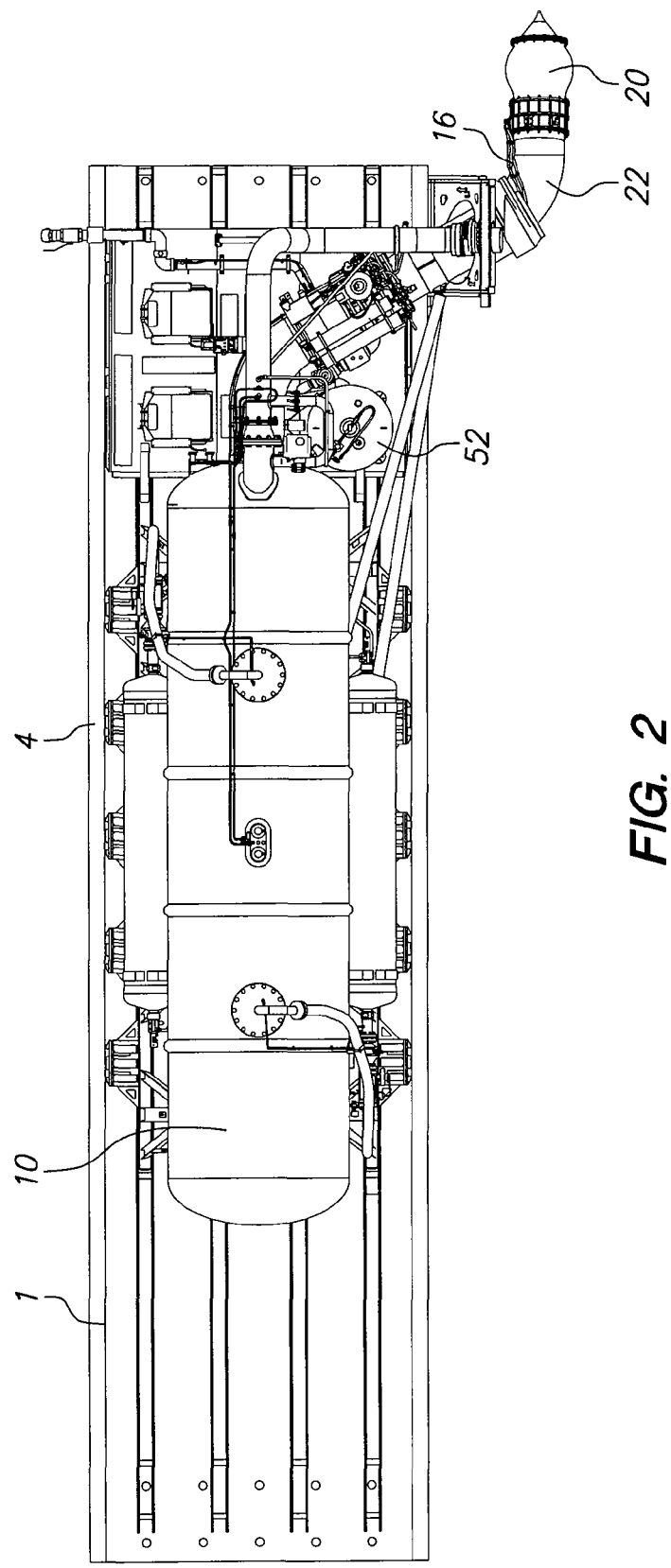
Figure 3:
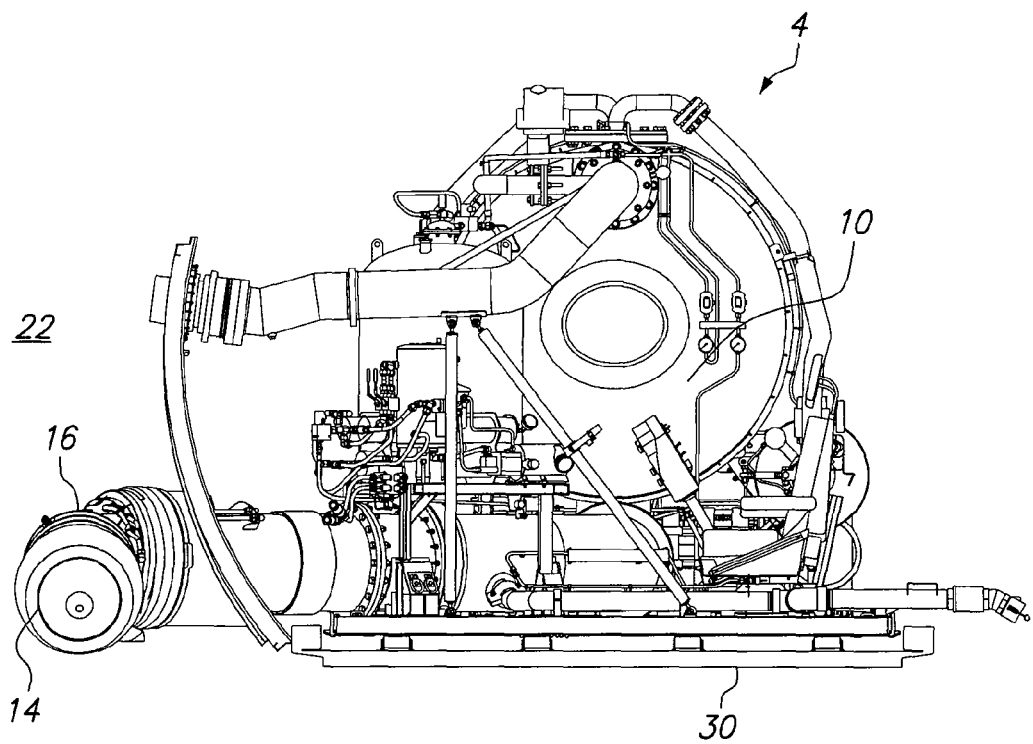
Figure 4:
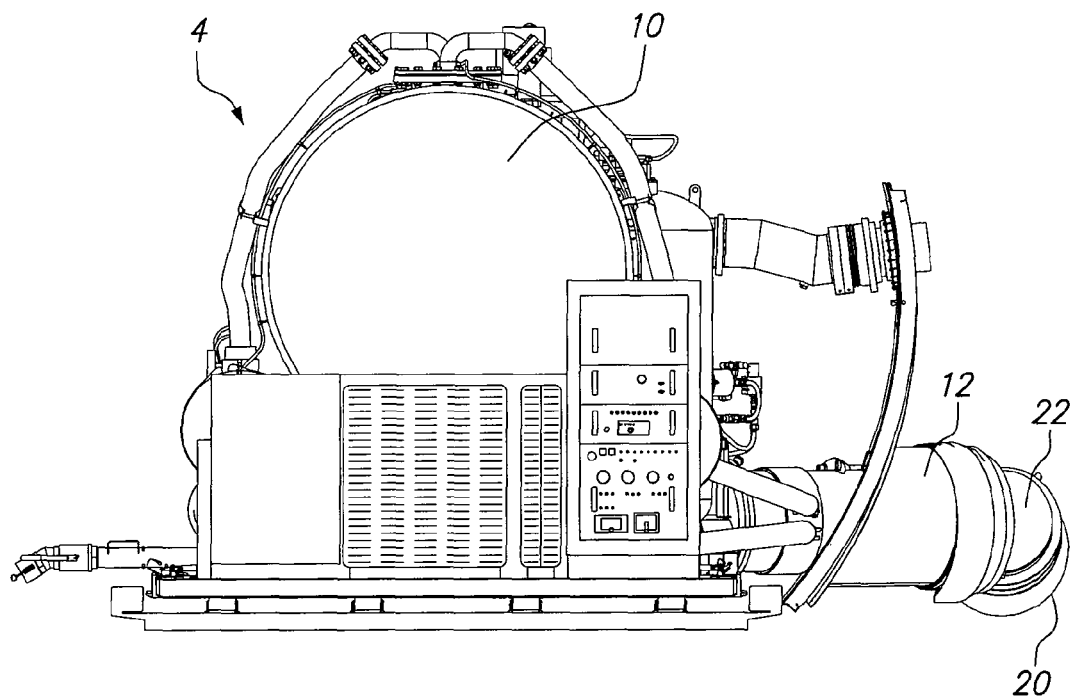

A compressor 47 is in pneumatic communication with the air inlet 44, including a compressed air storage reservoir 48 between the compressor and the main body. In a still further embodiment of the system 4, there is an additive tank 52 for input of additives to the discharge pipe (FIG. 2).

As best seen in reference to FIGS. 8 through 12, at each inlet 44 there is disposed a diffuser 100, which has a main body 102 having a base 104, generally cylindrical side walls 106 and an opening opposite the base 108. The side walls 104 expand circumferentially from the base to the opening.

In operation of the system 4, retardant exits through the outlets 14 and 18 to the conduit 12 which extends out the plane's troop door. The system can disperse all 3,000 gallons in as little as 4 or 5 seconds over a fire, producing a fire line that is 60 feet wide and a quarter mile long. It can then be reloaded in as few as eight minutes.

The aerial dispersion equipment of the disclosed systems and methods may be implemented using modular components that may be configured for compatibility with conventional cargo loading and unloading systems of modern aircraft, including side-loading cargo systems of wide-body passenger and cargo aircraft having high lift capacities.

Wide-body commercial aircraft may be quickly and temporarily modified for aerial dispersion purposes, allowing a large fleet of high capacity aerial dispersion aircraft to be quickly assembled, for example, in response to a wildfire or other rapidly-developing emergency such as an oil spill, chemical or biological contamination incident, building or refinery fire, etc. After use, the aircraft may be rapidly de-modified and returned to original condition, e.g., as commercial passenger or cargo plane, or as military transport or bomber.

Modular and connectable units in the shape of conventional cargo pods may be rapidly loaded and unloaded through side cargo doors into the cargo hold of high lift capacity wide-body commercial aircraft (e.g., such as 747, 767, 777 or MD-11 aircraft) or high lift capacity wide-body military/cargo aircraft (e.g., such as C-5, C-141, etc.) in a manner consistent with normal cargo loading operations to provide a removable and re-useable aerial dispersion system having a capacity much larger than the capacity of existing aerial dispersion systems. In those embodiments where the modular units are configured in the shape of conventional cargo pods, they may be employed with a wide variety of aircraft types that employ the same type of cargo pods regardless of the capacity of a given aircraft.

Furthermore, the modular nature of the cargo pods allows a given aircraft to be provided with an aerial dispersion system of desired or customized capacity and/or capability to fit a given application, i.e., by loading a desired number and type of modular units required to provide the desired capacity and capabilities of the system.

The high capacity aerial dispersion systems that may be provided using the disclosed systems and methods make possible aerial dispersion techniques that do not require low altitude or high angle dives or climbs to apply aerial dispersants to targets, such as fire hot spots. In this regard, high lift capacity wide-body aircraft may be provided with aerial dispersion systems having a capacity of aerial dispersant material that is many times the capacity of existing aerial dispersion systems. Using these high capacity aerial dispersion systems allows high volumes of aerial dispersant to be effectively applied to a target drop point location from a higher altitude without requiring steep diving or climbing maneuvers that may result in unacceptable g-force stresses.

Furthermore, since the disclosed aerial dispersion systems may be rapidly installed on conventional commercial and/or military aircraft, it is possible to provide a large number of high capacity aerial dispersion aircraft that may be deployed together to provide a very large volume of aerial dispersant simultaneously and/or sequentially onto a given target or targets, e.g., to rapidly and effectively suppress a wildfire. Following the aerial dispersion mission, the disclosed aerial dispersion systems may be rapidly de-installed or removed from the aircraft so that the commercial or military aircraft may be quickly returned to normal configuration for resumption of conventional flight operations.

Figure 13:
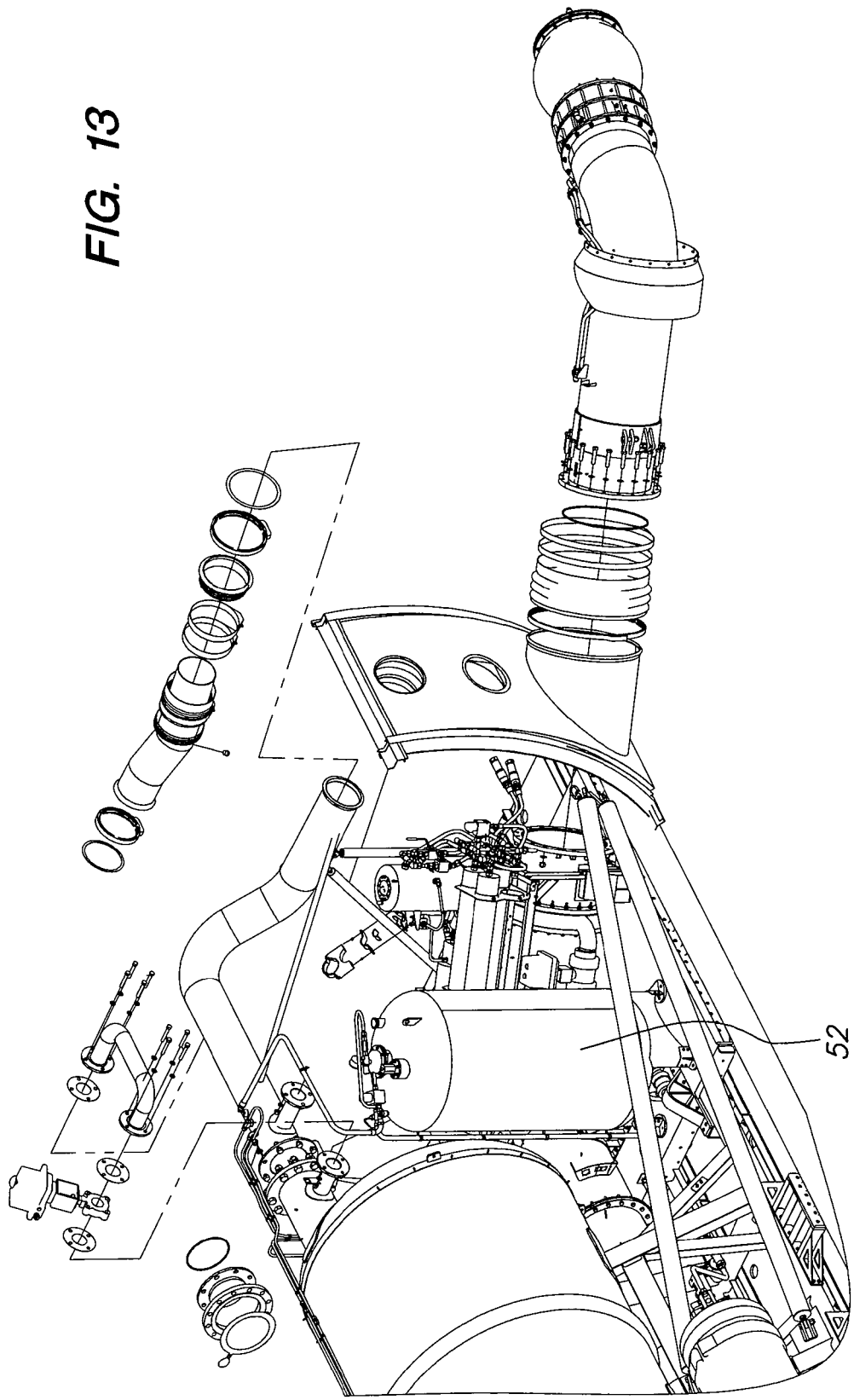

In reference to FIG. 13, a conventional door plug 120 is provided for the side of the aircraft 1, rather than requiring the cargo ramp door to be opened; this allows the aircraft to remain pressurized during the drop sequence.

The dispersal system is a fully self-contained system that employs an on-board compressor system replacing the ground support equipment requirements of the original modular airborne fire fighting system. A self-contained compressor saves valuable time and money by eliminating the necessity of ground support compressors.

Unlike the older system it replaces, the dispersal system requires no ground support compressors for recharge but instead employs a self-contained compressor system that is integral to the design. This system permits in-flight recharging to and from a drop.

A significant problem with previous airborne fire fighting systems is that they often "painted" the external tail sections of the aircraft in which they were installed with fire fighting fluid. This fluid can be somewhat corrosive to aircraft metal. Operators of such systems would incur the considerable expense of cleaning this fluid off of their air tankers.

To avoid this problem and to save operators the associated cost of having to clean retardant off its C-130s, the systems dispel the fire fighting fluid out the C-130s sealed paratroop door on the left side of the aircraft. This design ensures that no contamination of the aircraft's surfaces occurs during a drop.

An added advantage of this design is that the equipped aircraft can fly fully pressurized to and from the fire site and remain pressurized during the actual drop. Doing so affords the system operator major advantages over older systems in both crew safety and aircraft operating efficiency.

The system and apparatus of the present invention is scalable and can be used on any suitable aircraft adaptable for airborne fire fighting with the apparatus of the invention, including, for example, a Boeing C-17, a Boeing CH-47 helicopter, a Boeing V-22 Tilt-rotor, an EADS/CASA C-235/295 aircraft, an Alenia C-27, the C130 aircraft as shown in the Figures, or other rear loading aircraft having sufficient interior space to accommodate smaller or larger versions of the firefighting apparatus 4 of the present invention. Other cargo handling systems can be employed as mounted on various aircraft floors. In general, aircraft of the type described herein have a fuselage defining an interior and an exterior of the aircraft.

In the practice of the disclosed systems and methods, one or more aerial dispersion systems may be employed on one or more host aircraft for aerial dispersement of any material that is suitable for aerial dispersement, including any of the aerial dispersement materials and in any of the aerial dispersement tasks described elsewhere herein. In this regard, it is possible that only a single host aircraft may be modified with the disclosed aerial dispersion system and employed for aerial dispersion of materials.

Although any type of aircraft having a baggage or cargo hold suitable for use with components of the disclosed systems may be employed, particular advantage may be realized by using high-lift capacity aircraft (e.g., aircraft having a gross carrying capacity of greater than or equal to about 100,000 pounds). For example, a typical 747 commercial aircraft has a gross carrying weight of about 140,000 pounds and is capable of carrying about 13,000 gallons of liquid dispersant material such as water. This is over four times the 3,000 gallon carrying capacity of a typical aerial dispersant system aircraft now employed for purposes such as aerial firefighting. Thus, using the disclosed systems and methods to convert even a single high lift capacity aircraft for aerial dispersion tasks achieves a significant increase in material dispersant volume capacity.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

Numerous references made throughout this specification to technologies and patents are intended to add to the disclosure herein, and the entire disclosure of each is expressly incorporated by reference to this document.

What is claimed is:

1. A system for dispersing liquid over a desired location, comprising a pressurized storage tank having a main body, an inlet in fluid communication with said main body for introducing liquid to said main body, a first outlet in fluid communication with said main body for dispersing said liquid, a second outlet in fluid communication with said main body for dispersing said liquid, an air inlet for charging air under pressure into said main body, and a diffuser for slowing down pressurized air entering said main body from said air inlet; wherein said storage tank is housed within a fuselage of a host aircraft.

2. The system of claim 1, wherein said diffuser comprises a base, generally cylindrical side walls, and an opening opposite said base.

3. The system of claim 1, wherein said storage tank is produced of corrosion-resistant material.

4. The system of claim 1, wherein said storage tank is produced of stainless steel.

5. The system of claim 1, further comprising a second outlet from said storage tank.

6. The system of claim 1, wherein further comprising an additive tank for input of additives.

7. The system of claim 1, further comprising a discharge pipe in fluid communication with said outlet, wherein said discharge pipe comprises a pintle nozzle, said pintle nozzle being capable of controlling the flow rate of discharge.

8. The system of claim 7, wherein said discharge pipe comprises an elbow for redirecting a subsequent portion of said pipe generally horizontal to said main body.

9. The system of claim 8, wherein said elbow is formed at an angle allowing positioning of said pintle horizontal to said main body.

10. The system of claim 8, wherein said discharge pipe is supported on said storage tank by struts.

11. A system for dispersing liquid over a desired location, comprising a pressurized storage tank having a main body, an inlet in fluid communication with said main body for introducing liquid to said main body, a first outlet in fluid communication with said main body for dispersing said liquid, a second outlet in fluid communication with said main body for dispersing said liquid, an air inlet for charging air under pressure into said main body, and a diffuser for slowing down pressurized air entering said main body from said air inlet; wherein said pressurized tank is mounted on a pallet.

12. The system of claim 11, wherein said pallet is adapted to reversibly roll-on and roll-off of said host aircraft.

13. The system of claim 11, further comprising a control interface assembly affixed to an operator chair mounted to said pallet.

14. The system of claim 11, further comprising a compressor in pneumatic communication with said air inlet and a compressed air storage reservoir between said compressor and said storage tank.

15. The system of claim 11, further comprising an additive tank for input of additives.

16. The system of claim 11, wherein the system can be used for fighting fires.

17. The system of claim 11, wherein the system can be used for dispersing oil, pesticides, bio-remediation materials, defoliant materials, fertilizer materials, or herbicide materials.

18. The system of claim 11, wherein liquids can be dispensed at over 200 gallons per second.

19. The system of claim 11, wherein liquids can be dispensed at over 700 gallons per second.

20. The system of claim 11, further comprising a discharge pipe in fluid communication with said outlet, wherein said discharge pipe comprises a pintle nozzle, said pintle nozzle being capable of controlling the flow rate of discharge.

21. A system for dispersing liquid over a desired location, comprising a pressurized storage tank having a main body, an inlet in fluid communication with said main body for introducing liquid to said main body, a first outlet in fluid communication with said main body for dispersing said liquid, a second outlet in fluid communication with said main body for dispersing said liquid, an air inlet for charging air under pressure into said main body, and a diffuser for slowing down pressurized air entering said main body from said air inlet; and further comprising an additive tank for input of additives.

22. The system of claim 21, wherein said diffuser comprises a base, generally cylindrical side walls, and an opening opposite said base.

23. The system of claim 21, further comprising a second outlet from said storage tank.

24. The system of claim 21, further comprising a compressor in pneumatic communication with said air inlet and a compressed air storage reservoir between said compressor and said storage tank.

25. The system of claim 21, wherein liquids can be dispensed at over 200 gallons per second.

26. The system of claim 21, wherein the system can be used for dispersing oil, pesticides, bio-remediation materials, defoliant materials, fertilizer materials, or herbicide materials.

27. The system of claim 21, further comprising a discharge pipe in fluid communication with said outlet, wherein said discharge pipe comprises a pintle nozzle, said pintle nozzle being capable of controlling the flow rate of discharge.

28. The system of claim 27, wherein said discharge pipe comprises an elbow for redirecting a subsequent portion of said pipe generally horizontal to said main body.

29. The system of claim 28, wherein said elbow is formed at an angle allowing positioning of said pintle horizontal to said main body.

30. The system of claim 28, wherein said discharge pipe is supported on said storage tank by struts.

31. A system for dispersing liquid over a desired location, comprising a pressurized storage tank having a main body, an inlet in fluid communication with said main body for introducing liquid to said main body, a first outlet in fluid communication with said main body for dispersing said liquid, a second outlet in fluid communication with said main body for dispersing said liquid, an air inlet for charging air under pressure into said main body, and a diffuser for slowing down pressurized air entering said main body from said air inlet; wherein liquids can be dispensed at over 200 gallons per second.

32. The system of claim 31, wherein the system can be used for fighting fires.

33. The system of claim 31, wherein the system can be used for dispersing oil, pesticides, bio-remediation materials, defoliant materials, fertilizer materials, or herbicide material.

34. The system of claim 31 wherein said diffuser comprises a base, generally cylindrical side walls, and an opening opposite said base.

35. The system of claim 31, further comprising a second outlet from said storage tank.

36. The system of claim 31, further comprising an additive tank for input of additives.

37. The system of claim 31, wherein liquids can be dispensed at over 700 gallons per second.

38. The system of claim 31, further comprising a discharge pipe in fluid communication with said outlet, wherein said discharge pipe comprises a pintle nozzle, said pintle nozzle being capable of controlling the flow rate of discharge.

39. The system of claim 38, wherein said discharge pipe comprises an elbow for redirecting a subsequent portion of said pipe generally horizontal to said main body.

40. The system of claim 39, wherein said elbow is formed at an angle allowing positioning of said pintle horizontal to said main body.

41. The system of claim 39, wherein said discharge pipe is supported on said storage tank by struts.

* * * * *